United States Patent [19]
Millard

[11] Patent Number: 6,036,191
[45] Date of Patent: Mar. 14, 2000

[54] ROTARY VALVE SEAL ASSEMBLY

[75] Inventor: Barry John Millard, Reading, United Kingdom

[73] Assignee: Adwest Engineering Limited, Reading, United Kingdom

[21] Appl. No.: 08/543,153

[22] Filed: Oct. 13, 1995

Related U.S. Application Data

[63] Continuation of application No. 08/087,774, Nov. 12, 1993, abandoned.

[30] Foreign Application Priority Data

Jan. 16, 1991 [GB] United Kingdom ............... 9100903

[51] Int. Cl.[7] ..................................................... F16J 9/06
[52] U.S. Cl. ........................ 277/553; 277/411; 277/580; 277/582
[58] Field of Search ................... 277/27, 188 R, 277/188 A, 165, 117, 206 R, 223, 171, 227, 173, 216, 196, 176, 144, 145, 411, 553, 580, 582

[56] References Cited

U.S. PATENT DOCUMENTS

| | | | |
|---|---|---|---|
| 1,356,393 | 10/1920 | Nolte | 277/198 |
| 2,177,700 | 10/1939 | Fisher | 277/216 |
| 2,402,033 | 6/1946 | Flinn | 277/96.1 |
| 2,631,907 | 3/1953 | Johnson, Jr. | 277/144 |
| 2,877,071 | 3/1959 | Arnot | 277/216 |
| 2,991,003 | 7/1961 | Petersen | 277/227 |
| 3,602,255 | 8/1971 | Bishop | 137/560 |
| 3,612,545 | 10/1971 | Storms | 277/198 |
| 4,462,601 | 7/1984 | Skoog | 277/27 |
| 4,566,703 | 1/1986 | Zitting | 277/165 |
| 4,570,736 | 2/1986 | Walderf | 180/143 |
| 4,633,907 | 1/1987 | Adams | 277/27 |
| 5,165,702 | 11/1992 | Duffy | 277/176 |

FOREIGN PATENT DOCUMENTS

| | | | |
|---|---|---|---|
| 0 321 770 A1 | 6/1989 | European Pat. Off. | |
| 4 017 036 A | 11/1991 | Germany . | |
| 453524 | 12/1949 | Italy | 277/223 |
| 126491 | 5/1919 | United Kingdom | 277/227 |
| 427993 | 5/1935 | United Kingdom | 277/227 |
| 2 030 093 | 4/1980 | United Kingdom . | |

OTHER PUBLICATIONS

"Concept Omégat: l'élément moderne d'étanchéité", Énergie Fluide, vol. 25, No. 1, pp. 80–83, Jan. 1986.

Primary Examiner—Daniel G. DePumpo
Attorney, Agent, or Firm—Finnegan, Henderson, Farabow, Garrett & Dunner L.L.P.

[57] ABSTRACT

A seal assembly for providing a seal between a cylindrical member and a bore formed in a housing, the housing and cylindrical member being rotatable relative to one another, the seal assembly being located within an annular groove formed in the cylindrical member and having an annular seal body of a plastics material having an outer axially extending circumferential face for sealing abutment with the bore and at least one radially extending end face for sealing abutment with a side face of the groove and a resilient ring member located in abutment with the inner axially extending circumferential face of the seal body for urging said outer circumferential face radially outward to maintain sealing abutment between said outer circumferential face and the bore during cooling of the seal and housing, the resilient ring member having an axial end face contiguous with or located in-board of said end face of the seal body, the resilient ring and seal body being interconnected so as to be axially movable in unison with one another.

11 Claims, 2 Drawing Sheets

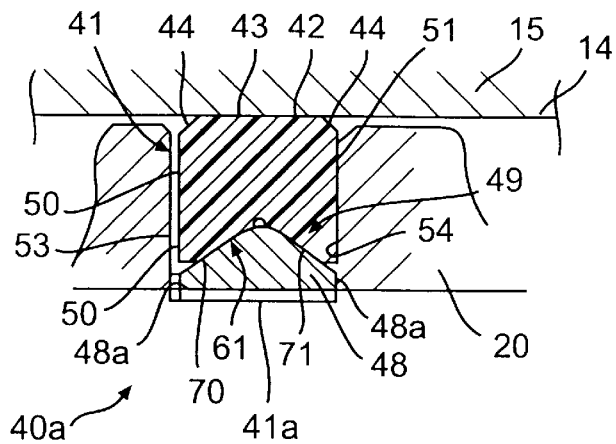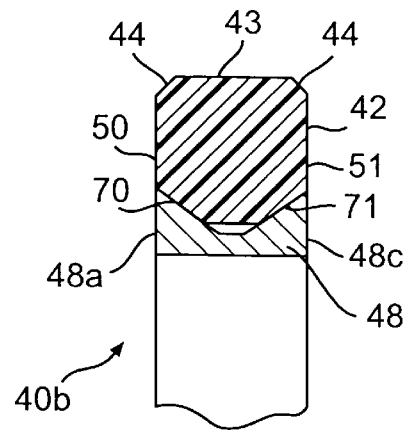
FIG. 2
FIG. 3
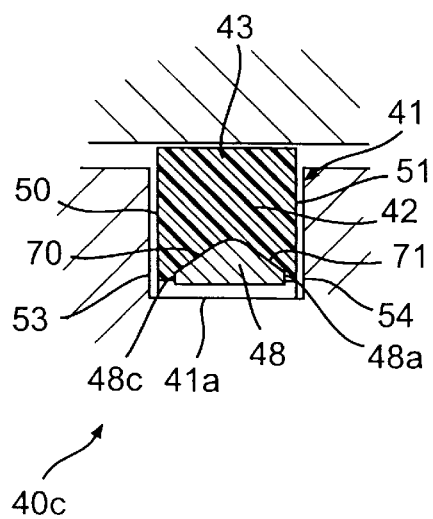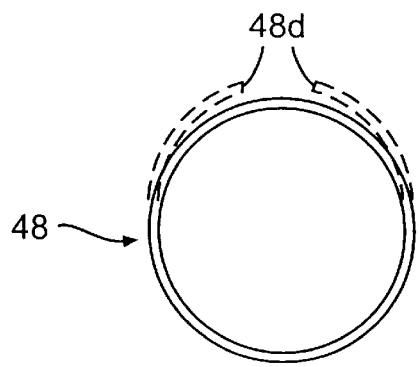
FIG. 4
FIG. 5

ROTARY VALVE SEAL ASSEMBLY

This application is a continuation of application Ser. No. 08/087,774, filed Nov. 12, 1993, now abandoned.

The present invention relates to a seal assembly for a rotary valve, in particular a rotary valve of the type used in power assisted steering mechanisms for vehicles. The invention also relates to a rotary valve including such a seal assembly.

A typical rotary valve as used in a power assisted steering mechanism of a vehicle is described in our UK patent 1299506. The rotary valve includes a rotor member located in a valve sleeve which is rotatably received in a housing. Seals are provided on the valve sleeve which sealingly isolate annular hydraulic fluid passageways from one another. The seals are usually formed from a plastic material such as polytetrafluoroethylene and whilst the hydraulic fluid and seals are at an elevated working temperature adequate sealing is provided between the seals and housing. However, there is a tendency for the plastic material to heat set when at the elevated working temperature so that on subsequent cooling a slight gap can occur between the seal and housing caused by the difference in co-efficients of thermal expansion for the material of the seal and housing. Thus at initial start-up at a cold temperature leakage can occur between the seal and housing resulting in a delay in build-up of hydraulic pressure which can be noticed by a driver of a vehicle by a reduction in the amount of power assistance given to operating the steering mechanism. The degree of leakage is temperature dependent and tends to be noticed in cold weather conditions. This kind of leakage is generally referred to as a cold-start phenomenon and is also exaggerated when the housing is made of a metal having poor wear characteristics such as aluminium.

It is a general aim of the present invention to provide a seal assembly which is capable of eliminating or substantially reducing the cold start phenomenon.

According to one aspect of the present invention there is provided a seal assembly for providing a seal between a cylindrical member and a bore formed in a housing, the housing and cylindrical member being rotatable relative to one another, the seal assembly being located within an annular groove formed in the cylindrical member and having an annular seal body of a plastic material having an outer axially extending circumferential face for sealing abutment with the bore and at least one radially extending end face for sealing abutment with a side face of the groove and a resilient ring member located in abutment with the inner axially extending circumferential face of the seal body for urging said outer circumferential face radially outward to maintain sealing abutment between said outer circumferential face and the bore during cooling of the seal and housing, the resilient ring member being spaced from the groove bottom and having an axial end face contiguous with or located in-board of said end face of the seal body, the resilient ring and seal body being interconnected so as to be axially movable in unison with one another.

Preferably the seal body has a solid cross-section and is formed from a plastic material having a low co-efficient of friction, a suitable plastic material being polytetrafluoroethylene. Preferably the polytetrafluoroethylene contains a filler such as a glass filler, preferably about 15% by weight and has a minimum elongation of about 150% and a minimum tensile strength of about 1500 psi. Other suitable fillers may be carbon/graphite or suitable mineral.

The resilient ring member is preferably in the form of a split ring and is preferably formed from a resilient metal such as stainless steel. Preferably the inner circumferential face of the seal body and the outer circumferential face of the ring member have complimentary profiles which when engaged in abutment axially centralize the ring member and seal body and/or prevent relative axial movement between the ring member and seal body.

Preferably the complimentary profile on both the ring member and seal body is defined by opposed surfaces inclined relative to the axis of the ring member/seal body. Preferably the included angle between the opposed surfaces is about 155°.

On application of fluid pressure it is necessary for the seal assembly to slide axially in the groove in order to bring an end face of the seal body into sealing abutment with a side face of the groove. For a rotary valve used in a power assisted steering mechanism it is desirable for the seal assembly to move quickly into abutment with the side face of the groove.

Preferably the axial extent of the ring member is less than that of the seal body and the seal body includes a pair of radially extending end faces for sealing abutment with respective opposed sides of said groove.

Accordingly, it is preferable that, in cross-section, the combined radial height of the assembled seal body and ring member is the same as or greater than the axial width of the seal body. Preferably the radially extending end face of the seal body extends radially inwardly from the outer circumference of the seal body for the entire or majority of said combined radial height.

The outer axially extending circumferential face of the seal body is cylindrical and extends continuously for the entire or majority of the width of the seal body. Advantageously, the outer peripheral edges of the seal body are defined by chamfered faces. The extent of the chamfer along the outer circumferential face may be adjusted during manufacture in order to reduce the contact area with the bore and thereby reduce the force required for axially sliding the seal assembly.

According to another aspect of the invention there is provided a rotary valve including a valve sleeve and a rotor rotatably received in a bore of a housing, the valve sleeve having at least one seal assembly as defined above providing a seal between the sleeve and the bore.

Various aspects of the present invention are hereinafter described with reference to the accompanying drawings, in which FIG. 1 is a sectional view of a rotary valve for a power assisted steering mechanism according to the present invention;

FIG. 2 is an enlarged sectional view of a seal assembly according to a first embodiment of the present invention;

FIG. 3 is an enlarged sectional view of a seal assembly according to a second embodiment of the present invention;

FIG. 4 is an enlarged sectional view of a seal assembly according to a third embodiment of the present invention;

FIG. 5 is a side view of a ring member of a seal assembly according to the present invention.

Figure 1:
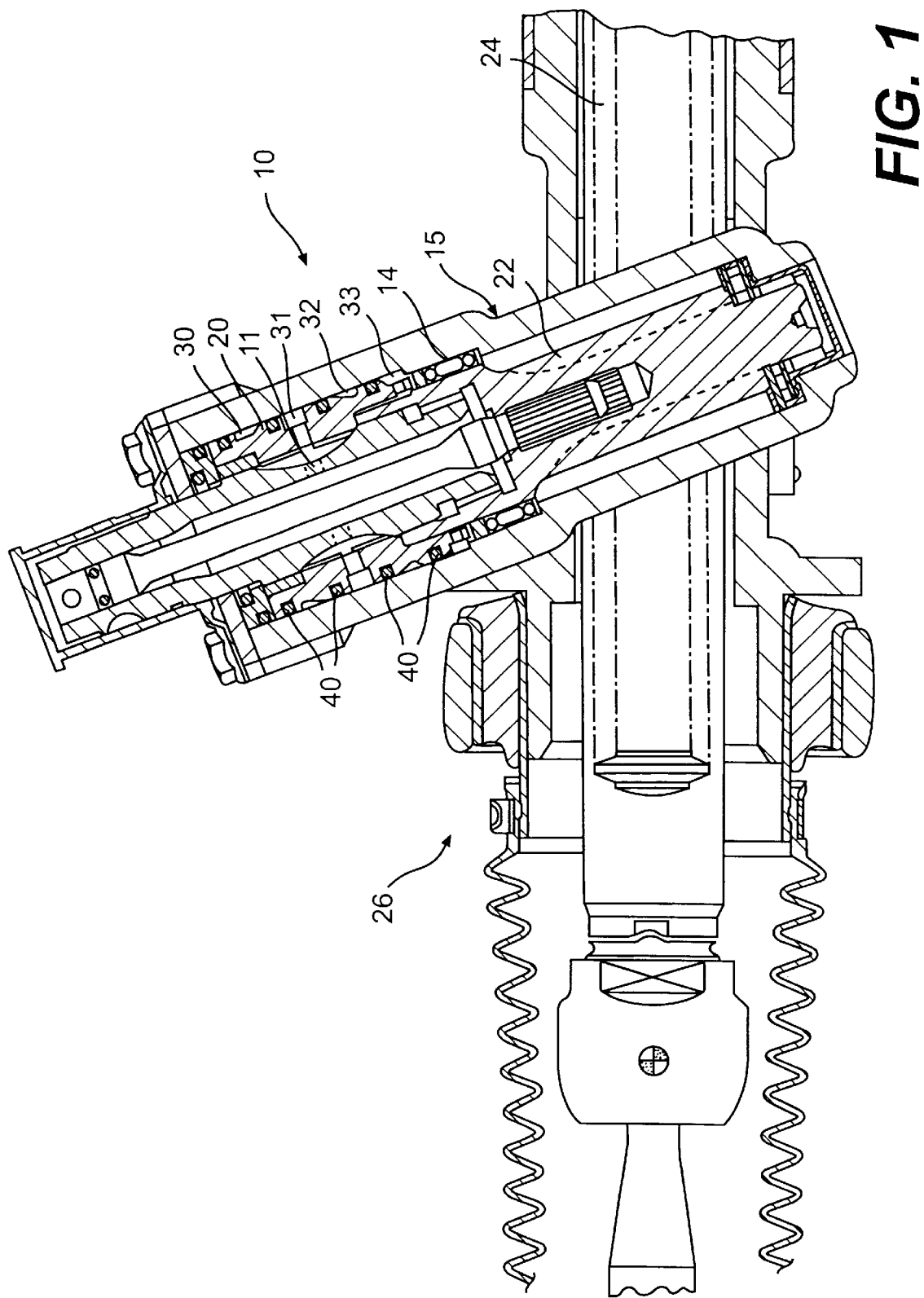

Referring initially to FIG. 1, there is shown a rotary valve 10 for use in a power assisted steering mechanism. The rotary valve 10 is basically of the same construction as that shown in our UK patent 1299506 and reference should be made thereto for a fuller description of the rotary valve and power assisted steering mechanism. In essence, the rotary valve 10 includes a rotor 11 which is received in a valve sleeve 20 which is received in a bore 14 of housing 15. The sleeve 20 is connected to a worm gear 22. The worm gear 22 drivingly engages with a rack 24 of a steering mechanism 26. Operation of the rotary valve 10 and steering mechanism 26 are described in UK patent 1299506.

The outer circumference of the sleeve 20 includes four annular hydraulic fluid passageways 30,31,32 and 33 which, in use, are supplied with pressurized hydraulic fluid which is distributed by the rotary valve to provide power assistance in a known manner.

The passageways 30,31,32 and 33 are isolated from one another by annular seal assemblies 40. Each seal assembly 40 is located within a groove 41, as shown in FIG. 2, formed in the sleeve 20 and in use provides a seal between the wall of the bore 14 and the outer surface of sleeve 20.

A first embodiment 40a is illustrated in FIG. 2. The seal assembly 40a includes an annular seal body 42 which is preferably of solid cross-section having an axially extending outer circumferential surface 43 which sealingly abuts against the wall of bore 14. A ring member 48 is located in abutment with the inner circumferential face 49 of the seal body and serves to provide a radially outwardly directed biasing force for urging the outer face of the seal body radially outwardly.

The seal body 42 has a pair of radially extending end faces 50,51 capable of sealingly abutting against respective side faces 53,54 of groove 41. As shown, end faces 50,51 are planar and extend for the majority of the combined radial height of the assembled seal body and ring member.

The axial width of the seal body is less than the width of groove 41 defined between side faces 53,54 so that on application of hydraulic fluid pressure to one side of the seal assembly) the seal assembly slides axially in the groove to bring the end face 50 or 51 on the low pressure side of the seal assembly into sealing abutting contact with side face 53 or 54 respectively.

In addition, the diameter of the bottom 41a of the groove 41 is slightly smaller than the inner diameter of the seal assembly 40a so that fluid pressure may be applied to urge the face 43 radially outwards to ensure sealing contact between face 43 and bore 14.

As seen in FIG. 2, the radial extent of the seal assembly, in cross-section, only slightly exceeds the depth of the groove 41. In addition, each end face 50,51 extends for a majority of the combined height of the seal assembly and thereby presents a relatively large sealing face 50 or 51 for abutment with side faces 53,54 respectively with only a relatively small marginal radial portion exposed in the gap between the valve sleeve 20 and bore 14.

In this way it is possible for the seal to be exposed to relatively high fluid pressures whilst resisting extrusion.

In addition, the radial height of the seal assembly is chosen to be substantially the same as or, preferably greater than, the axial extent of the seal body 42. In this way the area of the end face of the seal assembly is greater than the area of the inner circumferential face of the seal assembly so that applied fluid pressure creates a greater force for moving the seal assembly axially. Accordingly sliding of the seal assembly into contact with the low pressure side face 53 or 54 respectively is facilitated. In addition, the outer peripheral edges of the seal body are preferably defined by chamfers 44. These chamfers 44 effectively reduce the axial extent of the face 43 and so during manufacture the extent of the chamfers into face 43 can be altered to alter the area of contact between face 43 and the bore to reduce frictional resistance to axial sliding movement.

As shown in FIG. 2, the inner circumferential face 49 of the seal body and the outer circumferential face 61 of the ring member 48 are provided with complimentary profiles preferably in the form of a pair of opposed faces 70,71 inclined to the axis of the seal assembly. Preferably the included angle between faces 70,71 is about 115°. The opposed faces 70,71 serve to prevent relative axial movement between the seal body and ring member so that applied fluid pressure causes the seal assembly to move axially in unison. In addition the opposed faces 70,71 co-operate to axially centralise the seal body and ring member during assembly.

It will be appreciated that other profiles may be adopted if desired to achieve the same functions.

The degree of outward bias of the ring member 48 is chosen to be sufficient to maintain the face 43 of seal body 42 in sealing abutment with the bore 14 during cooling of the seal body 42 and housing 15 and thereby eliminate any gaps which would otherwise occur between the face 43 and bore 14 caused by the difference in co-efficients of thermal expansion of the materials forming the seal body 42 and housing 15.

An alternative embodiment 40b is illustrated in FIG. 3 which is of the same construction as the embodiment of FIG. 2 except that the direction of the opposed faces 70,71 are reversed.

As shown in FIGS. 2 and 3, the axial end faces 48a of the ring member 48 are contiguous with the faces 50,51 so as not to interfere with sealing abutment between faces 50,51 and faces 53,54 respectively.

A further embodiment 40c is shown in FIG. 4 which is of the same construction as the embodiment of FIG. 2 except that the end faces 48a are located in-board of the faces 50,51 and in that faces 50,51 extend for the entire radial height of the seal assembly.

In FIG. 5 there is illustrated a ring member 48. The ring member 48 is preferably formed from a strip of resilient metal such as stainless steel which is bent to form a nearly complete ring. This is shown in broken lines in FIG. 5. On assembly, the ring member is initially fed into groove 41 and the seal body is then slid axially over the sleeve 20 to enter groove 41 and seat onto the ring member 48. In seating onto the ring member to 48 the seal body compresses the ring member bring its opposed ends 48d closer to one another and thereby creates a radially outward biasing force.

I claim:

1. A hydraulic fluid seal assembly for providing a seal between a cylindrical member and a bore formed in a housing, the housing and cylindrical member being rotatable relative to one another, the seal assembly being located within an annular groove formed in the cylindrical member and comprising an annular seal body of a plastics material having an outer axially extended circumferential face for sealing abutment with the bore and at least one radially extended end face for sealing abutment with a side face of the groove, the seal body having an axial extent which is less than the axial extent of said groove and a resilient ring member means located in abutment with the inner axially extending circumferential face of the seal body for urging said outer circumferential face radially outward sufficiently to maintain sealing abutment between said outer circumferential face and the bore, the ring member having an axial end face which is one of contiguous with and located in-board of said end face of the seal body with the resilient ring member serving to maintain sealing abutment during cooling of the seal and housing, the resilient ring member being spaced from the groove bottom, and the resilient ring and seal body being interconnected so as to be slidably axially movable in unison with one another within said groove, with the inner circumferential face of the seal body and the outer circumferential face of the ring member having complimentary profiles defined by opposed surfaces inclined relative to the axis of the ring member/seal body with the complimentary profiles which when engaged in abutment axially centralize the ring member and seal body and/or prevent relative axial movement between the ring member and seal body.

2. A seal assembly according to claim 1, wherein the seal body has a solid cross-section and is formed from a plastics material having a low coefficient of friction.

3. A seal assembly according to claim 2, wherein the plastics material is polytetrafluoroethylene.

4. A seal assembly according to claim 3, wherein the polytetrafluoroethylene contains a filler.

5. A seal assembly according to claim 4, wherein the filler is a glass filler.

6. A seal assembly according to claim 1, wherein the resilient ring member is a split ring.

7. A seal assembly according to claim 1, wherein the included angle between the opposed surfaces is about 155°.

8. A seal assembly according to claim 1, wherein in cross-section, the combined radial height of the assembled seal body and ring member is the same as or greater than the axial width of the seal body.

9. A seal assembly according to claim 8, wherein the radially extending end face of the seal body extends radially inwardly from the outer circumference of the seal body for the entire or majority of said combined radial height.

10. A rotary valve in combination with a seal assembly, including a valve sleeve and a rotor rotatably received in a bore of a housing, the valve sleeve having at least one seal assembly according to claim 1 providing a seal between the sleeve and the bore.

11. A power assisted steering mechanism for a vehicle including a rotary valve in combination with a seal assembly according to claim 10.

* * * * *